United States Patent
Flanangan

(10) Patent No.: US 8,457,684 B2
(45) Date of Patent: Jun. 4, 2013

(54) METHOD AND APPARATUS FOR DETERMINING THE LOCATION OF A FEMTOCELL

(75) Inventor: Michael Joseph Flanangan, Chester, NJ (US)

(73) Assignee: Arieso Limited, Berkshire (GB)

(*) Notice: Subject to any disclaimer, the term of this patent is extended or adjusted under 35 U.S.C. 154(b) by 43 days.

(21) Appl. No.: 13/279,699

(22) Filed: Oct. 24, 2011

(65) Prior Publication Data

US 2013/0102325 A1    Apr. 25, 2013

(51) Int. Cl.
*H04M 1/00* (2006.01)

(52) U.S. Cl.
USPC ............ 455/552.1; 455/456.1; 455/444; 455/449

(58) Field of Classification Search
USPC ............ 455/403, 404.1, 404.2, 414.1, 405, 455/421, 422.1, 432.1, 432.3, 435.5, 436, 455/449, 456.1, 456.2, 456.3, 552.1, 553.1, 455/561, 562.1, 443, 444; 370/329, 331, 370/332, 334, 310.1, 328
See application file for complete search history.

(56) References Cited

U.S. PATENT DOCUMENTS

| | | | |
|---|---|---|---|
| 2010/0150109 A1* | 6/2010 | Bradley et al. | 370/331 |
| 2011/0105162 A1* | 5/2011 | Kim et al. | 455/500 |
| 2011/0274097 A1* | 11/2011 | Zhang et al. | 370/338 |
| 2011/0281574 A1* | 11/2011 | Patel et al. | 455/422.1 |
| 2012/0083288 A1* | 4/2012 | Siomina | 455/456.1 |
| 2012/0127949 A1* | 5/2012 | Yoshimoto et al. | 370/329 |
| 2012/0238268 A1* | 9/2012 | Radulescu et al. | 455/435.1 |
| 2012/0300864 A1* | 11/2012 | Merlin et al. | 375/260 |
| 2012/0322494 A1* | 12/2012 | Zhou et al. | 455/522 |
| 2013/0003580 A1* | 1/2013 | Kovacs et al. | 370/252 |
| 2013/0005326 A1* | 1/2013 | Flanagan | 455/422.1 |

* cited by examiner

*Primary Examiner* — Jean Gelin
(74) *Attorney, Agent, or Firm* — Barnes & Thornburg LLP

(57) ABSTRACT

A system and method of determining the geographical location of a femtocell (640A) of an asynchronous cellular wireless communication system (600) are provided. Timing data is obtained from communication signals received by a first group of mobile communication units (450) from a femtocell (640A), and from at least two macro cells (410A, 420A, 670A). A difference (D12) in path distance from two macro cells to the femtocell (640A) is estimated using the timing data. A correction is made to remove timing offsets of the base stations of the macro cells. This provides an estimate of the geographical location of the femtocell (640A), when combined with either a similar estimate derived from signals received from a third macrocell, or an estimate derived from signal propagation data.

23 Claims, 9 Drawing Sheets

METHOD AND APPARATUS FOR DETERMINING THE LOCATION OF A FEMTOCELL

FIELD OF THE INVENTION

The field of the invention relates to a method and apparatus for determining the location of a femtocell. The femtocell may be within the footprint of a macro cell of a wireless communication network.

BACKGROUND OF THE INVENTION

Wireless communication systems, such as the $3^{rd}$ Generation (3G) of mobile telephone standards and technology, are well known. An example of such 3G standards and technology is the Universal Mobile Telecommunications System (UMTS™), developed by the $3^{rd}$ Generation Partnership Project (3GPP™) (www.3gpp.org).

The $3^{rd}$ generation of wireless communications has generally been developed to support macro-cell mobile phone communications. Such macro cells are relatively large. They use high power base stations to communicate with wireless communication units within a relatively large geographical coverage area. These base stations are called 'NodeBs', in 3GPP terminology. One base station may provide coverage over several square kilometres.

Mobile and portable wireless communication units are often referred to as User Equipment (UEs), in 3G. The UEs communicate with a Core Network (CN) of the 3G wireless communication system. This communication is via a Radio Network Subsystem (RNS). A wireless communication system typically comprises a plurality of Radio Network Subsystems. Each Radio Network Subsystem comprises one or more cells, to which UEs may attach and thereby connect to the network. These cells may be termed 'macro cells'. Each cell has one or more base stations within it, i.e. 3G NodeBs. The coverage area supported by each base station may be divided up into multiple sectors. Each sector may then be served by a dedicated antenna. The sectors typically lie in different directions from the base station.

Femtocells, picocells and "small cells" are a recent development within the field of wireless cellular communication systems. Femtocells, picocells and small cells are typically lower power cells, which have a smaller coverage area than macro cells. The term femtocell is also used hereafter to encompass picocells or small cells, or similar.

Femtocells are wireless communication coverage zones that cover a relatively small area of the cellular network, usually within or straddling the edge of a macrocell. Each femtocell is supported by a low power base station, which may also be referred to as a 'Home NodeB' (HNBs). A femtocell may support communications to UEs in a restricted area, for example within a building. Often, the coverage area of a femtocell lies entirely within one macro cell, and may lie entirely within one sector of the macrocell.

Typical applications for femtocells include residential and commercial situations, e.g. office locations, and communication 'hotspots' with high demand for communication links. In these uses, a Home NodeB can be connected to a core network of the communication system via, for example, the Internet. A broadband connection or the like may provide this connection. In this manner, femtocells can be provided in a simple, scalable deployment.

Femtocells may be a suitable solution for specific in-building locations where, for example, network congestion at the macro-cell level may be a problem. The majority of Home NodeBs are likely to be owned and deployed by members of the public, as opposed to a Network Operator owning a Node B. Predictions show that, globally, there will in future be many more femtocells than macrocells. In some locations in the US, there may already be five or more femtocells in the coverage footprint of any one macrocell.

One task that needs to be performed within communication networks is 'Geo-location' of UEs, which means determining where they are. If the location of the femtocell is known, then it may be used to help with geo-location. However, the location of the femtocell is often not known.

Table 1 below shows, in its left column, known techniques for locating femtocells. The right column of table 1 shows some limitations of those techniques.

TABLE 1

Techniques for femtocell location

| Technique for locating femtocell | Limitation or drawback |
| --- | --- |
| Use GPS chip-set built into femtocell | (i) Some femtocells don't have GPS; (ii) Many femtocells are in urban locations or in buildings, and do not receive signals from enough GPS satellites |
| Billing records | The address on a billing record may relate to a completely different building than the one in which the femtocell is deployed |
| Use location information for a UE that is in communication with the femtocell. | Many UEs don't have an accurate way of determining their location. |
| Information provided by a user/proprietor of the femtocell, e.g. input to website. | Data may not be provided at all, or may be inaccurate. |
| Iteration of parameters, such as latitude and longitude, and inspection of the consequences on 'likelihood' functions | (i) Time consuming; (ii) Has greater uncertainties and inaccuracies than algorithms that allow for direct solutions of latitude and longitude |

In the remainder of this description, a mobile communications device such as a 3G 'UE' will be referred to as a 'mobile communication unit'. The term 'mobile communication unit' also encompasses other mobile telephone, smartphone, or other wirelessly linked devices that are operable in a cellular wireless telecommunications network.

In a different field of technology, there are also known approaches to identifying or correcting the location of a base station, i.e. a NodeB. Patent Application WO2010/081659, assigned to Arieso, Ltd. and incorporated by reference herein in its entirety, provides a technique for refining data on base station locations. The approach in WO'659 involves creating probability density functions for the location of a mobile communication unit, based on communications with a mobile communication network. A confidence score may be calculated for each probability density function. A combined function can then be derived from the individual confidence scores. Maximisation of the combined function may then lead to a corrected value for the location of a base station.

In an asynchronous mobile communications network, the various macrocells and base stations do not operate with mutually synchronised time signals. Any two different base stations in such a network will tend to have time clocks that have different offsets, relative to any universal measure of time. Those offsets may themselves vary over time. An asynchronous network offers different challenges for geolocation of mobile communication units than synchronous networks, in which signals from different base stations are synchronised.

Patent Application WO2010/083943, which is also herein incorporated by reference, provides a method and system for locating wireless mobile communication units, in an asynchronous mobile communications network. As part of WO'943, a statistical approach is used to calculate the difference between timing offsets for pairs of base stations. This is achieved using the timing of signals received by one or more wireless communication units. In WO'943, having eliminated the variable timing offsets between pairs of base stations, geo-location techniques from synchronous networks may then be used to locate wireless mobile communication units in the asynchronous wireless communication system.

There is a need for an improved method and apparatus for locating a femtocell of a wireless communication network, whereby at least some of the above mentioned problems with known techniques are substantially alleviated. The challenges involved in locating femtocells differ from those involved in locating base stations or mobile communication units.

SUMMARY OF THE INVENTION

Accordingly, the invention seeks to mitigate, alleviate or eliminate one or more of the above-mentioned disadvantages singly or in any combination.

In accordance with the invention, an apparatus and a method are provided for estimating the location of a femtocell of a wireless communication network.

A cellular wireless communication system in accordance with a first aspect of the invention is provided.

A method of determining the geographical location of a femtocell of a cellular wireless communication system in accordance with a second aspect of the invention is provided.

A method of determining the geographical location of a femtocell of an asynchronous cellular wireless communication system in accordance with a third aspect of the invention is provided.

A tangible computer program product having executable program code stored therein for programming signal processing logic to perform a method in accordance with the invention may be provided.

BRIEF DESCRIPTION OF THE DRAWINGS

Embodiments of the invention will be described, by way of example only, with reference to the accompanying drawings, in which.

DETAILED DESCRIPTION OF EMBODIMENTS OF THE INVENTION

Examples of the invention will be described in terms of a method and apparatus for geolocating a femtocell of an asynchronous cellular wireless communication system. The figures showing the asynchronous cellular wireless communication system are generally designed as perspective views. This provides an illustration of the coverage area of the macro cells and femto cells, besides illustrating in schematic terms the hardware that provides that coverage.

The asynchronous cellular wireless communication system includes a plurality of macro cells and a plurality of wireless mobile communication units, and for example may be a Universal Mobile Telecommunications System (UMTS™). However, the inventive concept herein described may be implemented within asynchronous cellular communication networks adapted in accordance with alternative wireless communication technologies and standards.

Typically, femto and macro cells are considered to be part of a 'network' of the communication system. The communications 'system' may then be described as comprising the network, together with a plurality of wireless mobile communication units. The wireless mobile communication units communicate via wireless links to nodes of the network, and then through the network.

Figure 1:
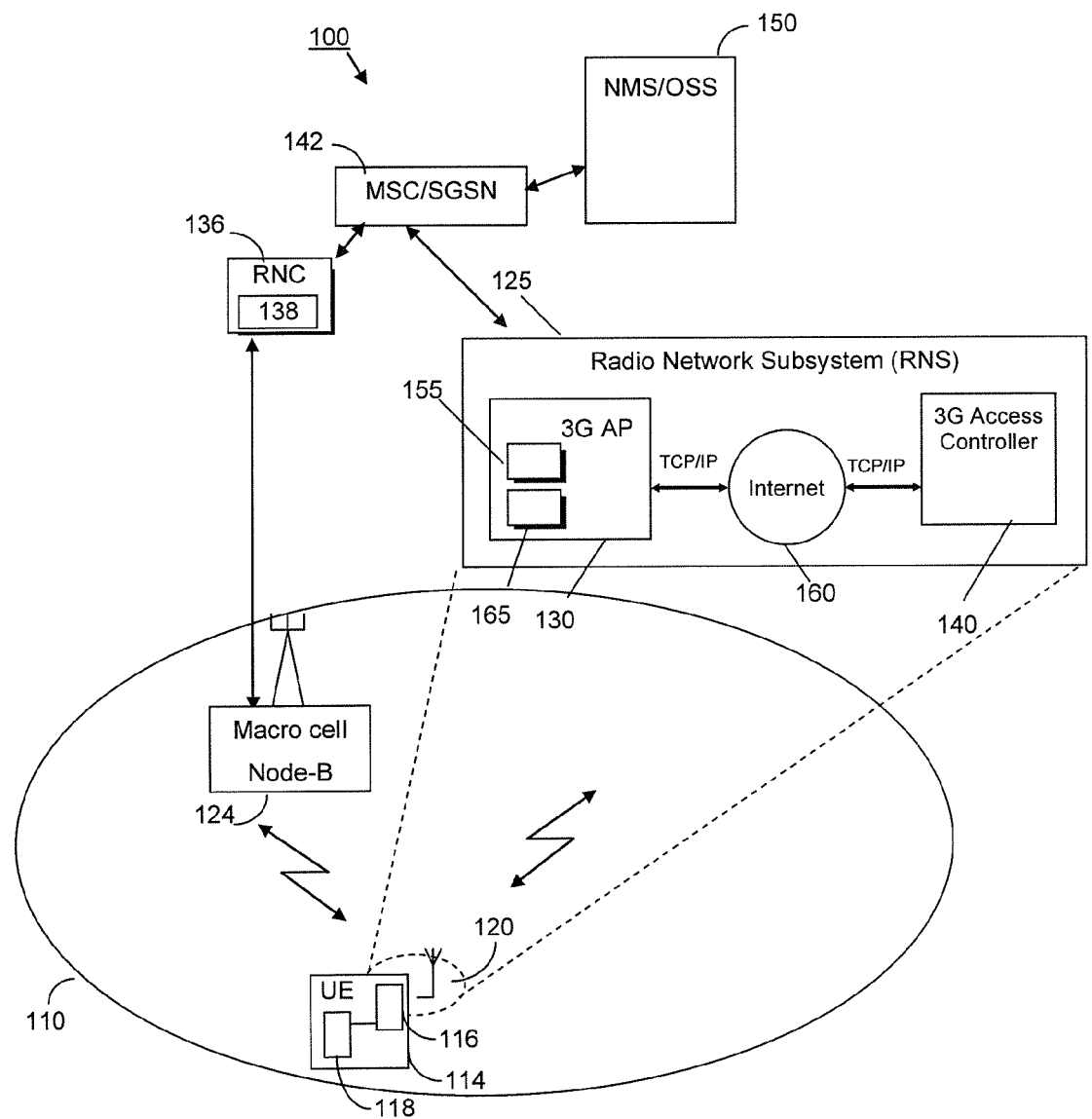
FIG. 1 is a schematic diagram, illustrating part of an exemplary cellular communication network.

Referring now to the drawings, and in particular to FIG. 1, an example of part of an asynchronous cellular communication system 100, is illustrated.

The network of the cellular communication system 100 is adapted in accordance with an example embodiment of the invention. The example illustrated in FIG. 1 is a communication system in the form of a third generation partnership project (3GPP™) UMTS™ network. Network 100 comprises a combination of a macro cell 110 and a 3G femtocell 120, in accordance with one embodiment of the invention.

For the example embodiment illustrated in FIG. 1, the radio network sub-system (RNS) comprises two distinct architectures, to handle the respective macro cell and femtocell communications.

For the macro cell 110, the radio network sub-system comprises a controller in the form of a Radio Network Controller (RNC) 136. RNC 136 has, inter alia, signal processing logic 138. The RNC 136 is operably coupled to a macrocell NodeB 124 for supporting communications within the macro cell 110. The RNC 136 is further operably coupled to a core network element 142, such as a serving general packet radio system (GPRS) support node (SGSN)/mobile switching centre (MSC), as known.

For the femtocell 120, a radio network sub-system 125 comprises a network element, which for the illustrated example embodiment is a 3G Home NodeB (HNB) 130. Although radio network sub-system 125 is shown in an exploded view in the upper right of FIG. 1, the components shown may all be located at the femtocell. The HNB 130 is arranged to perform a number of functions generally associated with a base station.

The radio network sub-system 125 further comprises a controller in the form of a 3G Access controller 140. A Home NodeB (HNB) is a communication element that supports communications within a communication cell, such as 3G femtocell 120. So the HNB 130 provides access for mobile communication units to the rest of the cellular communication network 100, via the 3G femtocell 120. An HNB 130 may typically be purchased by a member of the public and installed in their home. The HNB 130 may then be connected to a 3G Access Controller 140 over the owner's broadband internet connection 160.

Thus, a 3G HNB 130 may be considered as encompassing a scalable, multi-channel, two-way communication device. The 3G HNB 130 may be provided within, say, residential and commercial (e.g. office) locations, 'hotspots' etc, to extend or improve upon network coverage within those locations.

A typical HNB 130 for use within a 3GPP system may comprise:
(i) some traditional macro NodeB functionality; and
(ii) some aspects of the radio network controller (RNC) 136 functionality.

For the illustrated embodiment, the HNB 130 comprises transceiver circuitry 155 arranged to enable communication with one or more wireless mobile communication units. The wireless mobile communication units must be located within the general vicinity of the femtocell 120, and in particular within the cell 120. An example of such a wireless communication unit would be User Equipment (UE) 114, connected to Home NodeB (HNB) 130 via a wireless interface.

The 3G Access Controller 140 of the femtocell may be coupled to the core network element 142, as shown. In this manner, the HNB 130 is able to provide voice and data services to a cellular handset, such as UE 114, in femtocell 150. These services are provided in the same way as a conventional macro NodeB, but with the deployment simplicity of, for example, a Wireless Local Area Network (WLAN) access point.

For the illustrated example of FIG. 1, the cellular communication network further comprises one or more network management systems (NMS) and/or operational support systems (OSS). These are illustrated generally at 150. Such systems may typically support, for example, processes such as maintaining network inventory, provisioning services, configuring network components, managing faults, etc.

Figure 2:
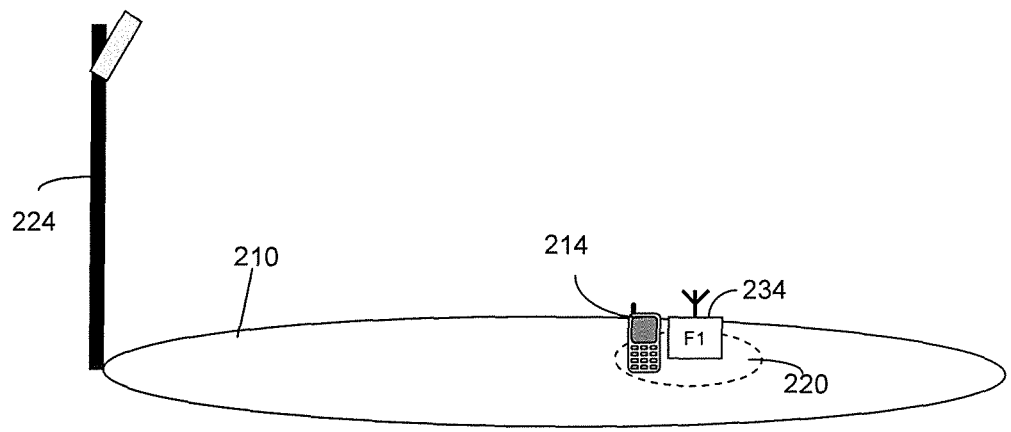
FIG. 2 is a schematic diagram, illustrating the location of a femtocell and a wireless communication unit within a footprint of an overlying macro cell.

FIG. 2 illustrates the limited range of a femtocell. Due to this limited range, femtocells typically reside entirely within the larger footprint of at least one macro cell. FIG. 2 illustrates schematically:
(i) The large distance that is typical between a wireless mobile communication device 214 and the NodeB 224 that supports the macro cell 210. This distance varies, depending on the particular location of the wireless mobile communication device 214 within the footprint of the macro cell 210.
(ii) The short distance between the wireless mobile communication device 214 and Home NodeB 234. Home NodeB 234 supports a femtocell 220, which is entirely within the footprint of the macro cell 210.

Due to the limited range of femtocell 220, the wireless mobile communication device 214 must be in close proximity to HomeNodeB 234 in order for the wireless mobile communication device 214 to be able to observe the femtocell 254. Here 'close proximity' may be typically within 50-100 meters. Within a building, the mobile communication device 214 might typically be within only 10-20 meters of the HomeNodeB 234 of the femtocell.

Accordingly, if the location of femtocell 220 observed by a mobile communication device 214 is accurately known, then the geographical location of the mobile communication device 214 may be determined to be approximately that of the HomeNodeB 234 supporting that femtocell. However, as noted previously, the location of many femtocells is not known accurately.

The inventors of the present invention have realised that timing data for signals received by a mobile communication device 214 from a femtocell 220 and at least two macro cells such as 210 may be used to derive an estimate for the location of the femtocell 220. The location of the femtocell 220 can then be added to the list of known features of the network, and is then available to provide location information for all mobile communication units that move into communication range with the femtocell 220.

Figure 3:
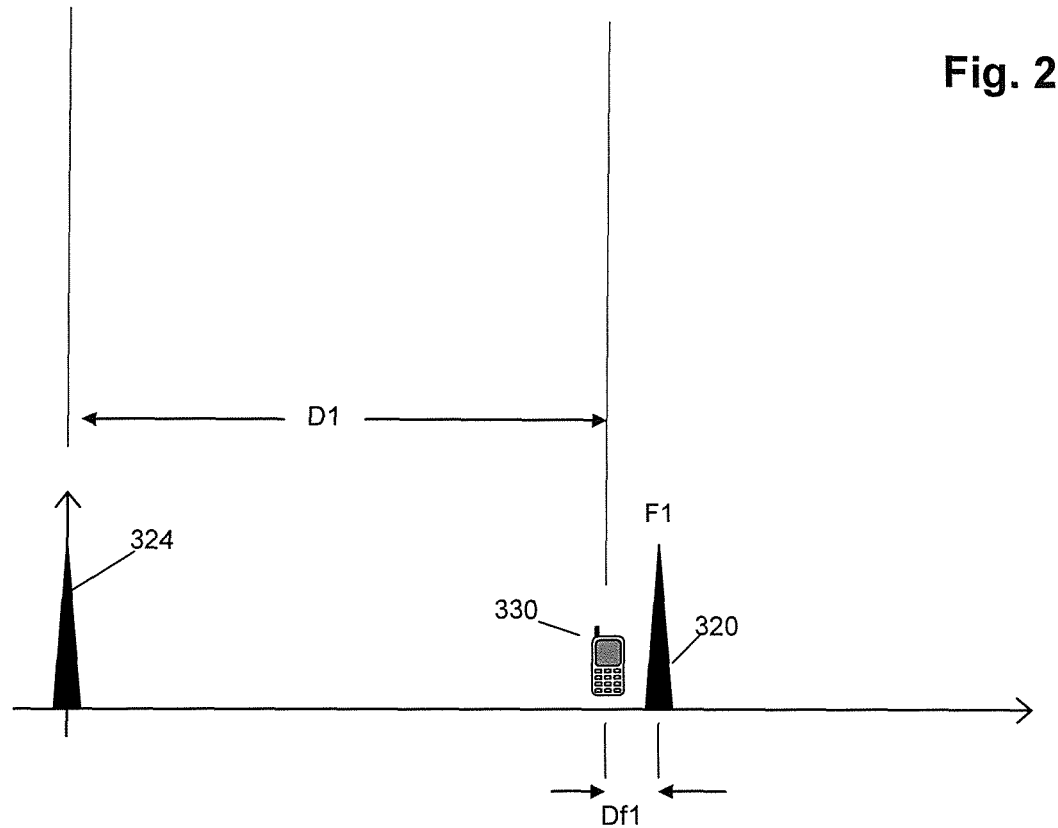
FIG. 3 is a two dimensional representation of the relative distances between the components of FIG. 2

FIG. 3 is a 2-dimensional representation of the relative distances between the components of FIG. 2. FIG. 3 illustrates one typical example of the relative distances between the mobile communication unit 214, the base station 224 and femtocell HomeNode B 234 of FIG. 2. This helps explain the timing of signals that may be received by a mobile communication device 214 from a femtocell and a macrocell.

The HomeNodeB 234 of femtocell 220 from FIG. 2 is shown at 320 in FIG. 3. The base station 224 of the macrocell 210 of FIG. 2 is shown at 324 in FIG. 3. The mobile communication device 214 of FIG. 2 is shown at 330 in FIG. 3. On FIG. 3:
(i) The distance from base station 324 to mobile communication device 330 is shown as distance D1; and
(ii) The distance from HomeNodeB 320 to mobile communication device 330 is shown as distance Df1.

Where a distance to a macro cell is referred to henceforth, that will mean the distance to the base station of the macrocell, unless otherwise specified. Where a distance to a femtocell is referred to henceforth, that will mean the distance to the HomeNodeB of the femtocell, unless otherwise specified.

Base station 324 provides signals that propagate wirelessly to mobile communication device 330. Those signals may, for example, be part of a control channel transmission, or part of a voice or data call. Base station 324 typically embeds a timestamp in some of its signal transmissions. The mobile communication unit 330 can compare the embedded timestamp to an absolute time reference. This comparison provides a value of a 'Measured time', which is the amount of time that a signal appears to have taken to travel from base station 324 to mobile communication unit 330.

The measured time may simply be the difference between the time stamp that was embedded in the communication by base station 224, and an absolute reference time at which the mobile communication unit receives the communication. The absolute reference might be the correct time for the time zone in which the base station is located, measured by a reference timing clock within the mobile communication unit.

It is useful to use two equations to describe the relationship between distance and time for a signal passing from a base station 324 to a mobile communication unit 330. This relationship can firstly be expressed in equation [1] below:

$$\text{Distance} = [\text{Speed of light}] \times [(\text{Measured time}) - (\text{Timing offset})] \quad [1]$$

Where:
(i) 'Distance' is the distance from the base station 324 to the mobile communication unit 330. This is distance D1 on FIG. 3.
(ii) 'Measured time' is the amount of time that a signal appears to have taken to travel from base station 324 to mobile communication unit 330. The time stamp and reference timing clock described above may provide this.

(iii) 'Timing offset' is the amount of time by which the timing reference of the base station 324 differs from the reference timing clock. In an asynchronous network, the timing offset may be both unknown, and subject to drift or other variability.

Equation [1] can be re-arranged and then re-written as equation [2] below:

$$Tm = T\text{path} + Tb \quad [2]$$

Here:
(i) Tm is the 'Measured time'
(ii) Tpath is the ratio of 'Distance'/(Speed of light). This is the time it takes the radio signal to travel the path from base station 324 to the mobile communication unit 330.
(iii) Tb is the base station 'Timing offset'.

Equations [1] and [2] are known from patent application WO2010/083943, at least for use between a mobile communication unit and a base station. However, equation [2] can be applied to the situation shown in FIG. 3 to provide another equation for signals received by mobile communications unit 330 from HomeNodeB 320 of the femtocell.

The timing of signals in FIG. 3 therefore can be described by equations [3] and [4] below. Equation [3] describes the timing of signals from the base station 324 to mobile communication unit 330:

$$TmB = T\text{path}B + TbB \quad [3]$$

Here:
(i) TmB is the 'Measured time' for signals to reach mobile communication unit 330 from base station 324.
(ii) TpathB is the time it takes the radio signal to travel the path D1 from base station 324 to the mobile communication unit 330.
(iii) TbB is the 'Timing offset' of base station 324.

Equation [4] describes the timing of signals from the Home NodeB 310 to mobile communication unit 330:

$$Tmf = T\text{path}f + Tbf \quad [4]$$

(i) Tmf is the 'Measured time' for signals reaching mobile communication unit 330 from HomeNodeB 320 of the femtocell.
(ii) Tpathf is the time it takes the radio signal to travel the path Df1 from HomeNodeB 320 to the mobile communication unit 330.
(iii) Tbf is the 'Timing offset' of the HomeNodeB 320, relative to the reference clock used by mobile communication unit 330.

Equations [3] and [4] appear to offer no easy solution. The values of TbB and Tbf are not known. In an asynchronous network, they are also likely to be varying over time. No measurement of either TpathB or Tpathf is available for the location of the mobile communication unit.

The invention provides a way of overcoming these difficulties. The inventors have, firstly, recognised that some mobile communication units can obtain measurements of signals from more then one macro cell, whilst in contact with a femtocell. The invention can, in particular, use measurements of the timing of signals from more than one macro cell to provide differential distance measurements.

Secondly, the inventors have realised that it is possible to approximate the distance between the base station of a cell and the HomeNodeB of a femtocell as being the distance from that base station to the mobile communications unit, as long as the mobile communication unit is in communication with the Home NodeB of the femtocell at that time point. This approximation is applied in two ways, as explained below.

Thus any distance measurement that can be derived for the separation between the mobile communication unit and the base station can be a proxy for the distance from the base station to the HomeNodeB.

Thirdly, the inventors have realised that the timing offsets TbB and Tbf of equations [3] and [4] can both be eliminated, using the measurements of signals from at least two macro cells, even without knowledge of the timing offset Tbf. The invention is now described in connection with an exemplary embodiment.

Figure 4:
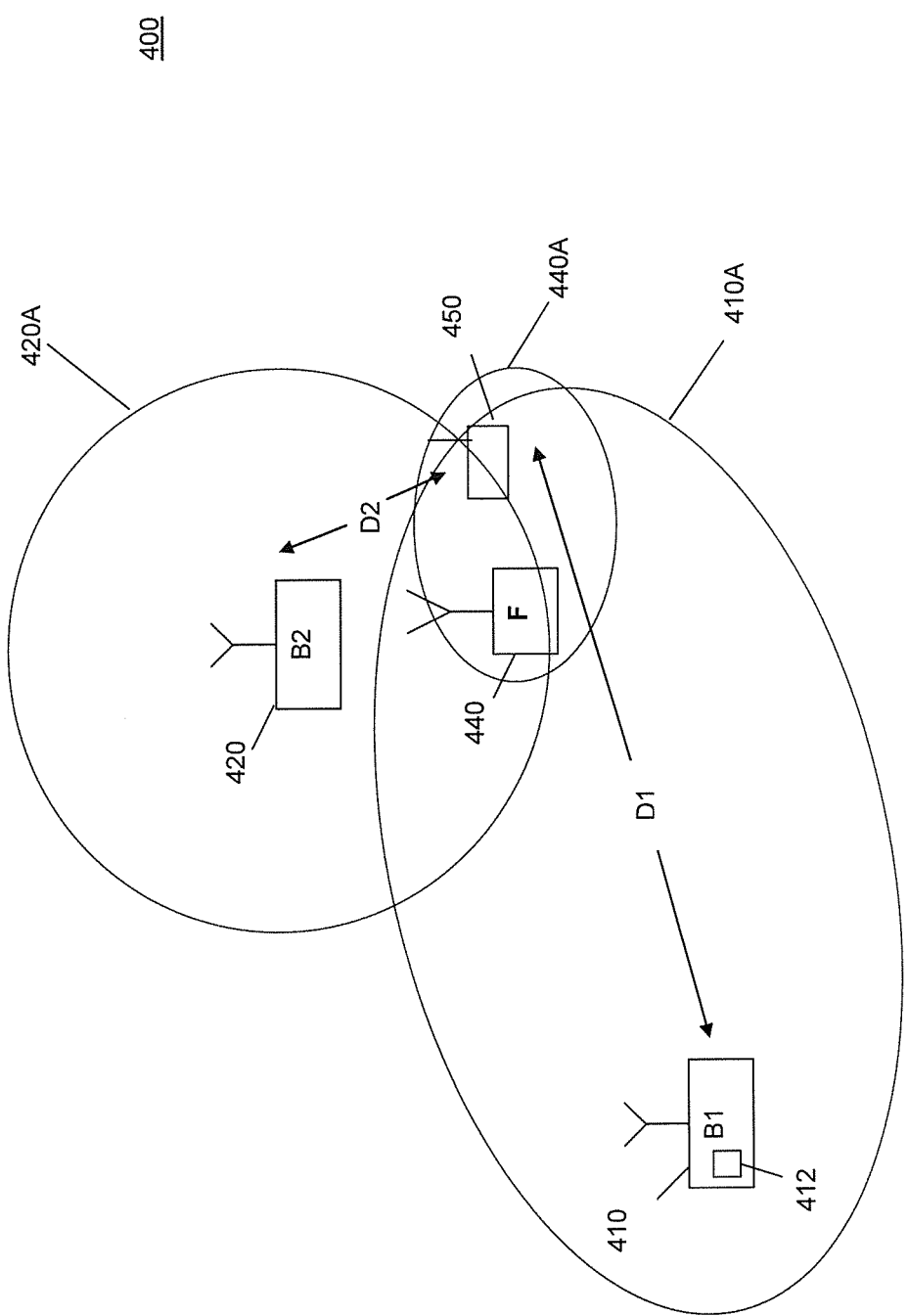
FIG. 4 is a schematic diagram, illustrating a wireless communication system in accordance with an embodiment of the invention.

FIG. 4 illustrates an asynchronous cellular wireless communication system 400. A first macro cell 410A is supported by a first base station 410, labelled B1, within the first macro cell. The boundary of the coverage area of the first macrocell is shown with reference 410A on FIG. 4. A second macro cell 420A is supported by a second base station 420, labelled B2, within the second macro cell. The boundary of the coverage area of the second macrocell is shown with reference 420A on FIG. 4.

A femtocell 440A is associated with the first macro cell 410A. The femtocell has a HomeNodeB 440, labelled F.

The exact shape of coverage areas 410A and 420A is not important. However, mobile communications unit 450 lies within both coverage areas, and is able to receive signals from base stations 410A and 420A, whilst also receiving signals from Home NodeB 440. Base stations 410 and 420 may support multiple sectors, so mobile communications unit 450 may in fact receive signals from just one of the sector antennae of each base station 410, 420.

Mobile communication unit 450 is a subscriber communications unit. Mobile communication unit 450 therefore provides signal measurements derived from real calls that it makes. 'Calls' may involve voice and/or data transmission and reception. Here these measurements may include signals received from base stations through which it is not placing a call, but from which it may receive signals that are used to monitor those base stations for signal strength and possible hand off. Signals from all such base stations may be recorded by the mobile communication unit 450 and incorporated in a measurement report. So, typically, the signal measurements are obtained by wireless mobile communication units in normal use, in the wireless communication system, rather than by dedicated 'drive by' testing.

Mobile communication unit 450 is at a first distance D1 from first base station 410 and at a second distance D2 from second base station 420.

The asynchronous cellular wireless communication system 400 further comprises signal processing logic operable to analyse the timing of signals received by the mobile communication unit 450 from each of base station 410, base station 420 and Home NodeB 440. The signal processing logic may also be operable to analyse the timing of more signals, such as those from other base stations or other mobile communication units, which are not shown in FIG. 4.

The signal processing logic may be located at various points in the network. For example, the signal processing logic may be located in Radio Network Controller 136 or Radio Network Subsystem 125 shown in FIG. 1. In FIG. 4, signal processing logic 412 has been shown in base station 410. If mobile communication unit 450 is, for example, a smartphone, it may also house the signal processing logic.

The method of the invention may be performed substantially anywhere within the cellular communication network 100 or 400, where the necessary timing data is available or can be calculated. The method may be implemented by way of a computer-readable code such as a software subroutine stored within the NMS/OSS 150 and executed on a signal processing module there.

In the embodiment of FIG. 4, signal processing logic 412 is adapted to derive a first timing difference measurement dTm1 from a first set S1 of communications. The first set S1 of communications comprises communications between:
(i) the mobile communication unit 450 and Home NodeB 440 of femtocell F; and
(ii) the mobile communication unit 450 and the first base station 410 of the first macro cell 410A.

The set S1 of communications are communications that are therefore obtained whilst mobile communication unit 450 is within communication range of Home NodeB 440.

Applying equation [3] to the communications between the mobile communication unit 450 and the first base station 410 provides equation [5] below:

$$Tm1 = Tpath1 + Tb1 \quad [5]$$

Here the variable 'Tpath1' is the time for signals to pass from base station 410 a distance D1 to mobile communication unit 450.

Applying equation [4] to the communications between the mobile communication unit 450 and the Home NodeB 440 provides equation [6] below:

$$Tmf = Tpathf + Tbf \quad [6]$$

First timing difference measurement dTm1 can be defined as the difference between the timing of signals that the mobile communication unit 450 receives from the first base station 410 and from the Home NodeB 440. This difference provides equation [7] below.

$$dTm1 = Tm1 - Tmf = (Tpath1 - Tpathf) + (Tb1 - Tbf) \quad [7]$$

Signal processing logic 412 is also adapted to derive a second timing difference measurement dTm2, from a second set S2 of communications, the second set 52 of communications comprising communications between:
(i) the mobile communication unit 450 and Home NodeB 440 of femtocell F; and
(ii) the mobile communication unit 450 and the second base station 420 of the second macro cell 420A.

Applying equation [3] to the communications between the mobile communication unit 450 and the second base station 420 provides equation [8] below:

$$Tm2 = Tpath2 + Tb2 \quad [8]$$

Here the variable 'Tpath2' is the time for signals to pass from base station 420 a distance D2 to mobile communication unit 450.

Signal processing logic 412 can then derive a second timing difference measurement dTm2 as shown in equation [9] below, which is analogous to equation [7]:

$$dTm2 = Tm2 - Tmf = (Tpath2 - Tpathf) + (Tb2 - Tbf) \quad [9]$$

Although Tpathf in equation [9] appears to be the same variable as Tpathf in equation [7], they may be different. This is because the mobile communication unit may have received the communications in set 51, from base station 410, at a different time than it received the communications in set S2 from base station 420. At these different times, the mobile communication unit may have been in different locations, and thus at different distances from Home NodeB 440.

The inventors have realised that, typically, the distance from mobile communications unit 450 to the Home NodeB 440 can be considered small in comparison to D1 and D2.

Therefore Tpath1 can be used in place of (Tpath 1−Tpathf) in equation [7]. Also, Tpath2 can be used in place of (Tpath2−Tpathf) in equation [9].

Based on this approximation, equations [7] and [9] respectively become equations [10] and [11] below:

$$dTm1 = Tpath1 + (Tb1 - Tbf) \quad [10]$$

$$dTm2 = Tpath2 + (Tb2 - Tbf) \quad [11]$$

The values for the first timing difference measurement dTm1 and the second timing difference measurement dTm2 can be combined by signal processing logic 412. This combination leads to values described by equation [12] below. Equation [12] is created by subtracting equation [11] from equation [10].

$$dTm12 = dTm1 - dTm2 = (Tpath1 - Tpath2) + (Tb1 - Tb2) = (Tpath1 - Tpath2) + dTb12 \quad [12]$$

The term dTm12 is a 'combined timing difference measurement'. The term dTb12 is equal to (Tb1−Tb2).

Notably, the value Tbf cancels out from equation [12]. There is then no need to know or calculate Tbf. The femtocells are likely to have substantial timing drift, over time, compared to macro cells, because the femtocells are consumer electronic devices. The more expensive, macro cells can afford to have expensive timing references, such as ovenized oscillators and sophisticated frequency lock loops. So the Home NodeBs of femtocells tend to have clock circuitry with greater rates of drift over time than base stations. A significant source of inaccuracy in timing measurements has been eliminated by eliminating Tbf from equation [12].

The combined timing difference measurement dTm12 still cannot provide an estimate of the location of Home NodeB 440 of the femtocell. However, the set of locations for which (Tpath1−Tpath2) is the difference in time taken for signals from the two base stations. This set of locations potentially provides useful information.

Figure 5:
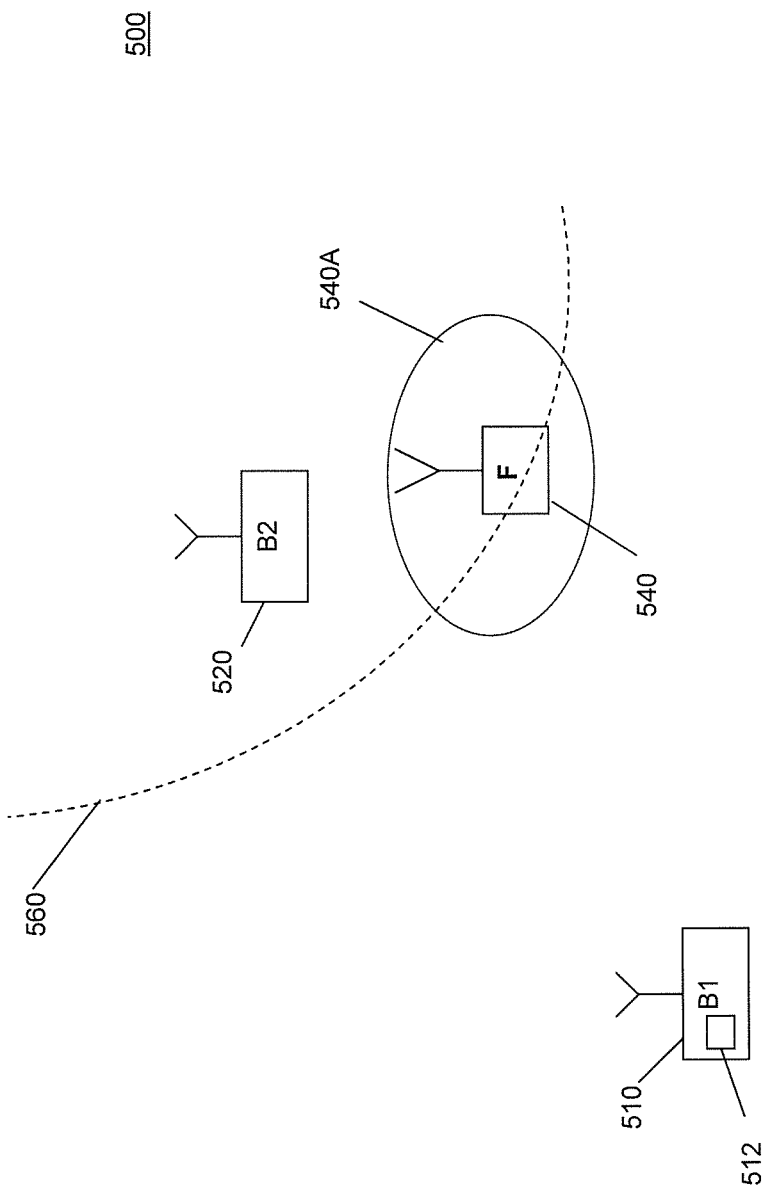
FIG. 5 is a schematic diagram, illustrating aspects of the wireless communication system of FIG. 4.

FIG. 5 illustrates an asynchronous cellular wireless communication system 500, which corresponds to communication system 400 of FIG. 4. First base station 510, signal processing logic 512, second base station 520, Home NodeB 540 and femtocell 440A correspond to the similarly numbered elements of FIG. 4.

Hyperbola 560 is the locus of all points for which the difference in signal transit times from the base stations is equal to the value (Tpath1−Tpath2). Home NodeB 540 lies on hyperbola 560.

In order to obtain the value (Tpath1−Tpath2), it is necessary to eliminate the timing offset term dTb12 from equation [12].

The inventors have realised that this can be done using an adaptation of the method used in patent application WO2010/083943, or another suitable approach. The method used in patent application WO2010/083943 is summarised at the end of this description.

Importantly, the value for dTb12 can be calculated from communications received by any mobile communication unit that can receive signals from first base station 510 and second base station 520 simultaneously. These mobile communication units do not need to be within range of HomeNodeB 540. Typically, many more mobiles can receive signals from first base station 510 and second base station 520 than the smaller pool of mobiles that also receive communications from Home NodeB 540. So there may be a very large number of measurements, available at all times, on which an estimate of dTb12 can be based.

The signal processing logic 512 may calculate the value for dTb12, or it may be calculated centrally within communication system 500. Communication system 500 may be arranged to provide a list, frequently updated, of the timing offsets between each pair of base stations 510, 520 throughout its network. This information may be prepared separately to the method of the invention, and simply be accessed each time that there is a need to check the location of a femtocell using the method of the invention.

When the term dTb12 has been eliminated, equation [12] leads directly to a corrected timing difference measurement dTm12c which is:

$$dTm12c = Tpath1 - Tpath2 \quad [13]$$

The value dTm12c is a timing value. Using the relation that time of travel for a radio signal is equal to the distance traveled divided by the speed of light, it is possible to derive an estimate of a difference D12 between the first distance D1 and the second distance D2, using the corrected timing difference measurement dTm12c. This is equation [14]:

$$D12 = (dTm12c) \times (\text{speed of light}) \quad [14]$$

The invention has thus yielded a first estimate for a distance measurement, which:
(i) Is independent of the timing offsets Tb1 of first base station 510 and Tb2 of second base station 520;
(ii) does not rely on prior knowledge of the location of the mobile communication unit 450;
(iii) does not require knowledge of the timing offset Tmf of the HomeNodeB 540 of the femtocell.

The inventors have also realised that there are various possible approaches to finding out where Home NodeB 540 is located on hyperbola 560. These approaches are summarised as options 1, 2 and 3 in the description that follows. Each of options 1, 2 and 3 involves combining the first estimate of the difference D12 between the first distance D1 and the second distance D2 with at least one other distance estimate. Such combinations thereby lead to a determination of the geographical location of the Home Node B 540 of the femtocell.

Before options 1, 2 and 3 are outlined, some explanation is provided about the numerical values of the timing measurements and differences that are observed in a UMTS wireless communications network.

Numerical Values of the Timing Measurements and Differences

Typically, mobile communication units within cellular communication networks, such as a UMTS network, routinely provide measurement reports to the network. Such reports comprise measured data for observed cells, including both femto and macro cells. The data typically comprises signal strength measurements and timing offset values for the observed cells. The invention may make use of this available data, or may rely on separate timing measurements made specifically for use with the invention.

The timing values provided in a measurement report may be used to derive an indication of a delay for signals travelling from a femtocell and/or macro cells to the mobile communication unit. So a mobile communication unit 330 or 450 can provide a measurement report, for use with the invention. The measurement data in the measurement report for mobile communication unit 450 may include timing data for signals from:
(i) Base station 410
(ii) Base station 420; and
(ii) HomeNodeB 440.

The actual values of the timing offsets themselves, such as Tmf and Tm1 or Tm2, are defined by the 3GPP standards. In 3GPP, each offset is the time offset between:
(i) The observed start of a 10 millisecond radio frame, transmitted by the cell in question, and as received by the wireless mobile communication unit; and
(ii) The 10 millisecond timing reference used by the wireless mobile communication unit.

The measurement unit for these offsets is the 'chip'. UMTS has a chip rate of 3.84 million chips per second. The unit of a chip is a thus a duration of $1/3.84$ microseconds=260.4 nsec So the timing values such as Tm1, Tm2, Tb1 and Tb2 represent the number of "chips" in a 10 msec radio frame, and hence vary between 0 and 38399. So a measurement may yield one of 38400 possible Tm or Tb values. This is $3.84e6 \times 10 e{-}3 = 38400$.

Accordingly, a corresponding observed timing difference dTm such as in equation [10] or equation [11], may also vary from 0 to 38399. The Tm offset values are expressed modulo 38400. This is because the addition of an integer multiple of 38400 chips, such as 38400 or 76800 chips, does not change the relative location of the 10 millisecond timing boundaries. Examples of the value that a timing difference dTm may take are therefore 0, 1, 2, 3, . . . , 38399.

The value of Tm in equation [2] is therefore given modulo 38400, for a UMTS system. So the value of dTm will also be expressed as a value between 0 and 38399. In fact, an arbitrary offset can also be introduced. This could be arranged to lead, for example, to an output value that is expressed as a value between −19200 and 19199. This example would still provide a total range of 38400, and be expressed modulo 38400. However, this allows, negative numbers as well as positive numbers. In this latter approach, some example dTm values include: 0, 1, −1, 2, −2, 3, −3, etc.

There will be no fixed or predictable relationship between physical proximity and dTm values. Variability in dTm values will be driven mostly by the random timing initialization and timing drifts in the base station and femtocell oscillators. The observed dTm value for a femto cell or a base station might, for example, take a value of, say, '15 chips' at a particular point in time.

The value of dTm1 for signals from HomeNodeB 440 and base station 410 will generally be quite different to the value of dTm2 for signals from HomeNodeB 440 and base station 420, due to different clock initialization and subsequent clock drift. For example, dTm1 might take a value of, say, '478 chips', and dTm2 might take a value of '49 chips' at any particular time point. That time point may be a window, of for example 15 minutes, during which signals are compiled by a mobile communications unit 450 into a measurement report.

The chip values measured in communication system 400 may have errors. In general, some noise errors can be eliminated from the estimate of the difference D12 using at least one of:
(i) antenna orientation information for a sector antenna of a first base station 410 of the first macro cell 410A;
(ii) antenna orientation information for a sector antenna of a second base station 420 of the second macro cell 420A; and
(ii) signal propagation delay information, which is typically available at the start of communications between the mobile communication unit 450 and the first macrocell 410A and/or the second macrocell 420A.

Option 1: Second Distance Estimate Based on Measurements from a Third Macrocell

This option provides a second estimate of the location of the femtocell from measurement made when the mobile communication unit can also receive signals from a third macrocell.

Figure 6:
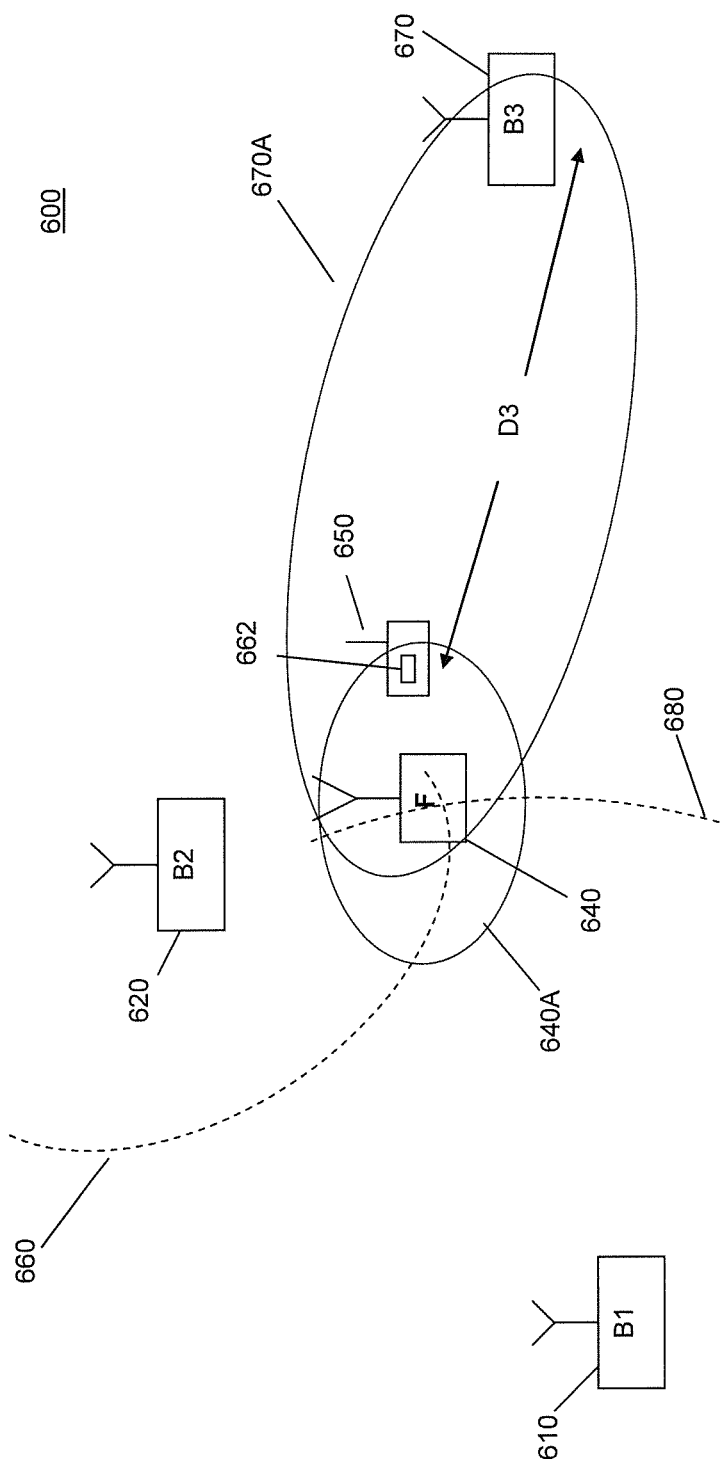
FIG. 6 is a schematic diagram, illustrating a wireless communication system in accordance with a further embodiment of the invention.

FIG. 6 shows this arrangement. In FIG. 6, first base station 610, second base station 620, Home NodeB 640 and femtocell 640A correspond to the similarly numbered elements of FIG. 5. Signal processing logic 612 is located within wireless mobile communication unit 650, which may for example be a smartphone.

The wireless communication unit 650 is at a third distance D3 from a third macro cell 670A of the communication system 600.

The second distance estimate is an estimate of the difference D13 between the first distance D1 and the third distance (D3). This difference D13 is used as an estimate of the difference between the distances of the femtocell 640A from the first macrocell 410A, see FIG. 4, and the third macro cell 670A.

The signal processing logic 662 of FIG. 6 is adapted to provide the estimate of the difference D13 between the first distance D1 and the third distance D3 using a similar approach to that explained in connection with FIG. 4 to calculate the difference D12 between the first distance D1 and the second distance D2. So signal processing logic 662 uses the first timing difference measurement dTm1 and a third timing difference measurement dTm3 that is derived for communications between the wireless mobile communication unit 650 and the third base station 670.

Specifically, third timing difference measurement dTm3 is derived for communications between:
(i) the mobile communication unit 650 and the femtocell 640; and
(ii) the mobile communication unit 650 and the third macro cell 670A.
Using these communications, a value for a timing offset dTb13 between the first macrocell 410A and the third macro cell 670A is eliminated. This achieved analogously to the elimination of dTb12 between equations [12] and [13].

Using option 1, communication system 600 may provide:
(i) an estimate of the difference D12 between the first distance D1 and the second distance D2, comprising estimates derived from a first plurality of communications, which provides a first set of possible locations for the femtocell 640 that are located on a first hyperbola 660;
(ii) an estimate of the difference D13 between the first distance D1 and the third distance D3, comprising estimates derived from a second plurality of communications, which provides a second set of possible locations for the femtocell 640 that are located on a second hyperbola 680.

As shown in FIG. 6, hyperbolae 660, 680 intersect. There may be only one point of intersection of hyperbolae 660, 680, or two points of intersection.

The signal processing logic 662 is adapted to determine whether the first and second hyperbolae 660, 680 intersect at only one point, and, if so, to select that point as the estimate of the location of the femtocell 640.

However, if the signal processing logic 662 determines that the first and second hyperbolae 660, 680 intersect at more than one point, then it may use antenna orientation information and/or signal propagation delay information to select one of the two points as the most likely estimate of the location of the femtocell 640. If the first and second hyperbolae 660, 680 intersect at more than one point, then the most likely location of HomeNodeB 640 is within the main beam of a sector antenna of one of the base stations. Knowledge of the direction of these main beams may then be used to choose a most likely location for HomeNodeB 640.

The arrangement of FIG. 6 may provide a balance between accuracy of the estimate of the location of the femtocell 640A and the need for a mobile communication unit to be able to receive signals from multiple macrocells. In summary, the method of FIG. 6 offers a method of determining the geographical location of femtocell 640A of an asynchronous cellular wireless communication system 600, by:

a) obtaining first timing data from a first plurality of signals received by a first group of mobile communication units 450 from femtocell 640A and each of at least three macro cells 410A, 420A, 670A;
b) obtaining second timing data from a second plurality of signals received by a second group of mobile communication units from the three macro cells 410A, 420A, 670A;
c) deriving, from the second timing data:
(i) an estimate of the first timing offset dTb1,2 for a first pair 410A, 420A of the macro cells; and
(ii) an estimate of the second timing offset dTb1,3 for a second pair 410A, 670A of the macro cells;
d) deriving the first estimate of the difference D12 in path distance from each of the first pair 410A, 420A of the macro cells to the femtocell 640A, using the first timing data and the estimate of the first timing offset dTb1,2;
e) deriving the second estimate of the difference D13 in path distance from each of the second pair 410A, 670A of the macro cells to the femtocell 640A, using the first timing data and the estimate of the second timing offset dTb1,3;
f) combining the first D12 and second D13 estimates of the differences in path distance, to determining the geographical location of the femtocell.

Figure 7:
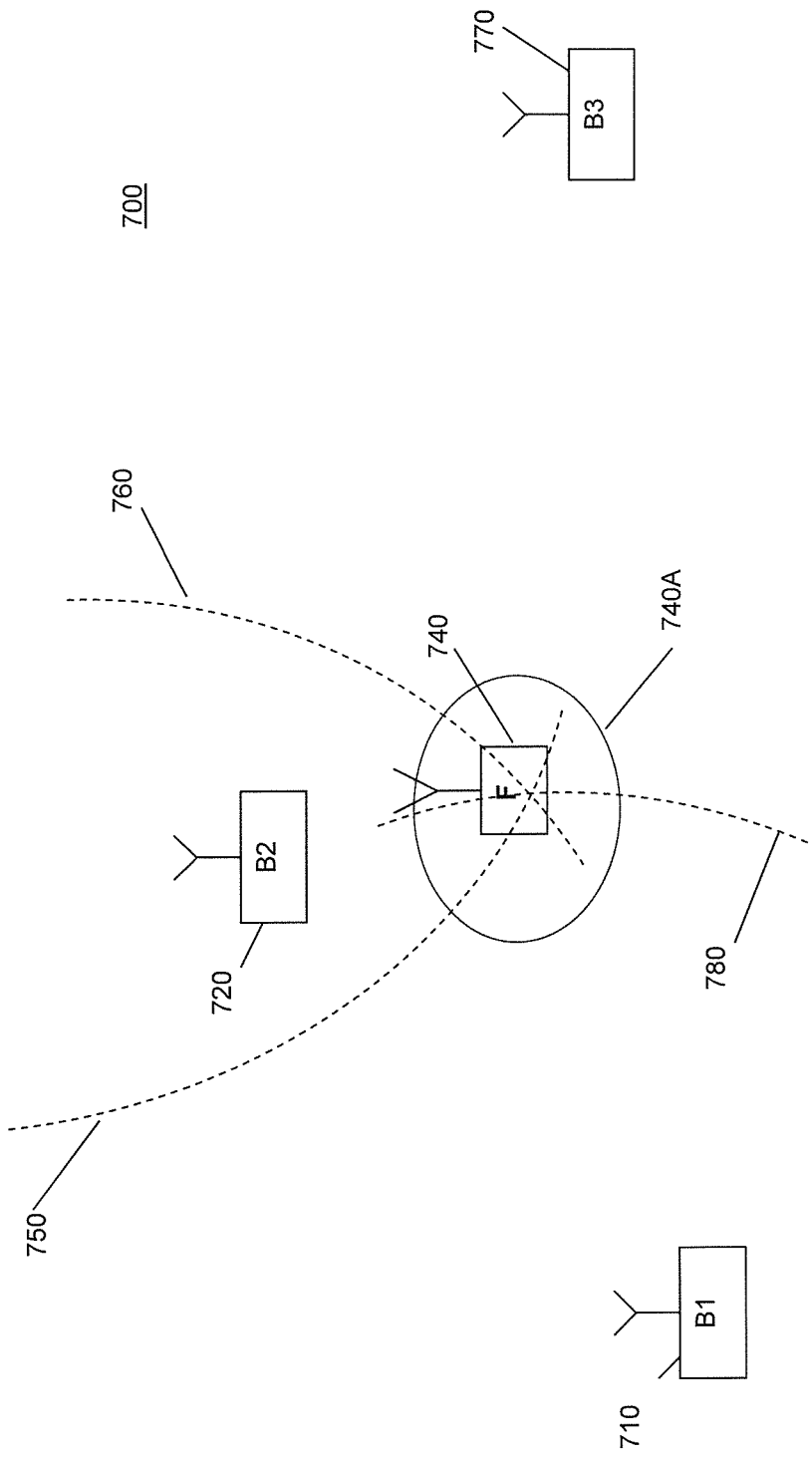
FIG. 7 is a schematic diagram, illustrating a wireless communication system in accordance with a further embodiment of the invention.

FIG. 7 illustrates a further possible way of improving the location estimate derived using the arrangement shown in FIG. 6. Base stations 710, 720 and 770, and HomeNodeB 740 of FIG. 7 correspond to the similarly numbered elements in FIG. 6.

The approach to deriving first distance estimate D12 of equation 14 leads to hyperbola 750 as the set of possible locations for femtocell 740A. Applying similar steps to signals received by the wireless mobile communication unit from base stations 710 and 770 leads to hyperbola 780. Applying the steps to signals received by the wireless mobile communication unit from base stations 720 and 770 leads to hyperbola 760.

The three hyperbolae of FIG. 7 cross at a point, at which HomeNodeB 740 of femtocell 740A is located. The use of these three hyperbolae may help to eliminate errors due to noise, and to increase the accuracy of the location estimate of femto cell 740A.

Option 2: Second Distance Estimate Based on Measurements from a Third Macrocell and a Fourth Macrocell This option provides a second estimate of the location of the femtocell from measurement made when the mobile communication unit can also receive signals from a third macrocell and a fourth macrocell. If a wireless mobile communication device provides a measurement report with measurements from four, five or six macrocells, then this approach is possible.

Figure 8:
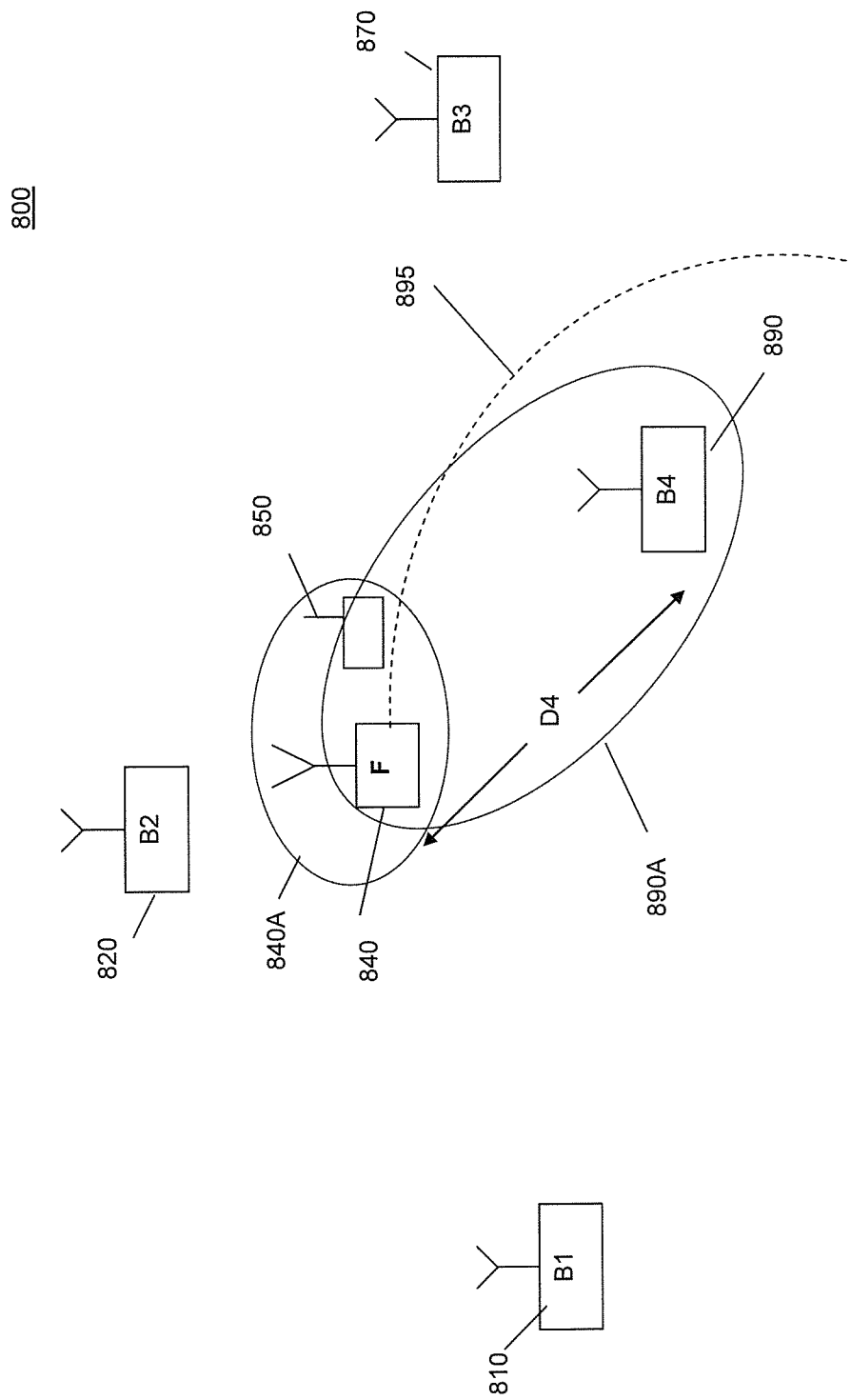
FIG. 8 is a schematic diagram, illustrating a wireless communication system in accordance with a further embodiment of the invention.

FIG. 8 shows this arrangement. Base stations 810, 820 and 870, and HomeNodeB 840 of FIG. 8 correspond to the similarly numbered elements in FIG. 7. The mobile communication unit 850 is at a fourth distance D4 from a base station 890, labelled B4, of a fourth macro cell 890A of the asynchronous cellular wireless communication system 800.

The mobile communication unit 850 is thus located:
(i) at a third distance D3 from base station 870 of third macro cell 870A of the communication system 800; and
(ii) at a fourth distance D4 from the base station 890 of fourth macro cell 890A of the communication system 800.
Mobile communication unit 850 can receive signals from both the third and fourth macrocells.

In communication system 800, the second distance estimate is an estimate of the difference D34 between the third distance D3 and the fourth distance D4. This estimate of the difference D34 is derived in a similar manner to the derivation of the first distance estimate D12 for signals received by the mobile communication unit 850 from base stations 810 and 820, but uses a third timing difference measurement dTm3 and a fourth timing difference measurement dTm4.

The third timing difference measurement dTm3 is for communications between:
(i) the mobile communication unit 850 and the femtocell 840A; and
(ii) the mobile communication unit 850 and the third macro cell 870A.

The fourth timing difference measurement dTm4 is for communications between:
(i) the mobile communication unit 850 and the femtocell 840A; and
(ii) the mobile communication unit 850 and the fourth macro cell 890A.

The second distance estimate therefore provides a hyperbola 895 of possible locations for femtocell 840. Hyperbola 895 crosses hyperbola 660 of FIG. 6, which is also calculated, at one or more points. The approaches outlined above with regard to option 1 may be used to select the point which provides the best estimate of the location of HomeNodeB 840 of femtocell 840A.

Option 3: Second Distance Estimate Based on Signal Propagation Delay

Returning to FIG. 5, it is possible to derive a location estimate for HomeNodeB 540, and hence femtocell 540A, without using signals received from a third or a fourth macrocell.

The second distance estimate can be derived from signal propagation delay information for communications between the mobile communication unit 450 and one of the first 510A and second 520A macro cells. Such signal propagation information is usually in the form of access signal information, which is only available when communication with a macrocell commences. So up-to-date propagation delay information is often not available long after communication starts.

Signal propagation information may simply provide a set of possible locations for the femtocell 540A that are located on a circle around one of base station 510 or 520. However, the circle of possible locations will then intersect hyperbola 560 at either one or more than one point. Hyperbola 560 may comprise estimates derived from a plurality of communications, and provides the first set of possible locations for the femtocell as explained with regard to FIG. 5.

If hyperbola 560 and the circle intersect at only one point, then that can be taken as the estimate of the location of the femtocell 540A. If hyperbola 560 and the circle intersect at two or more points, then antenna orientation information for a sector antenna of a first base station 510 of the first macro cell 410A or a sector antenna of a second base station 520 of the second macro cell 420A, can be used to reduce multiple possible geographical locations of the femtocell 540A down to an estimate of a single geographical location for the femtocell.

Figure 9:
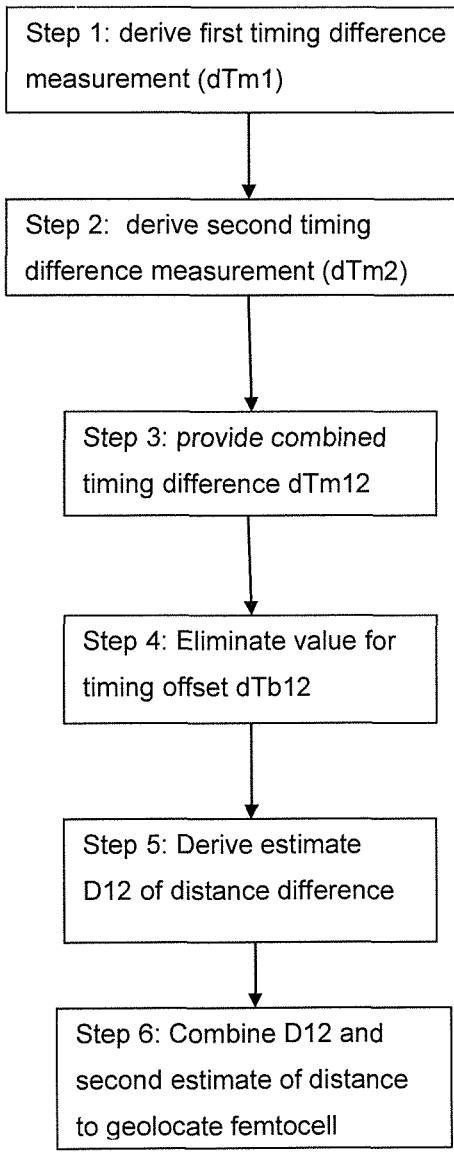
FIG. 9 is a method in accordance with an embodiment of the invention.
Figure 10:
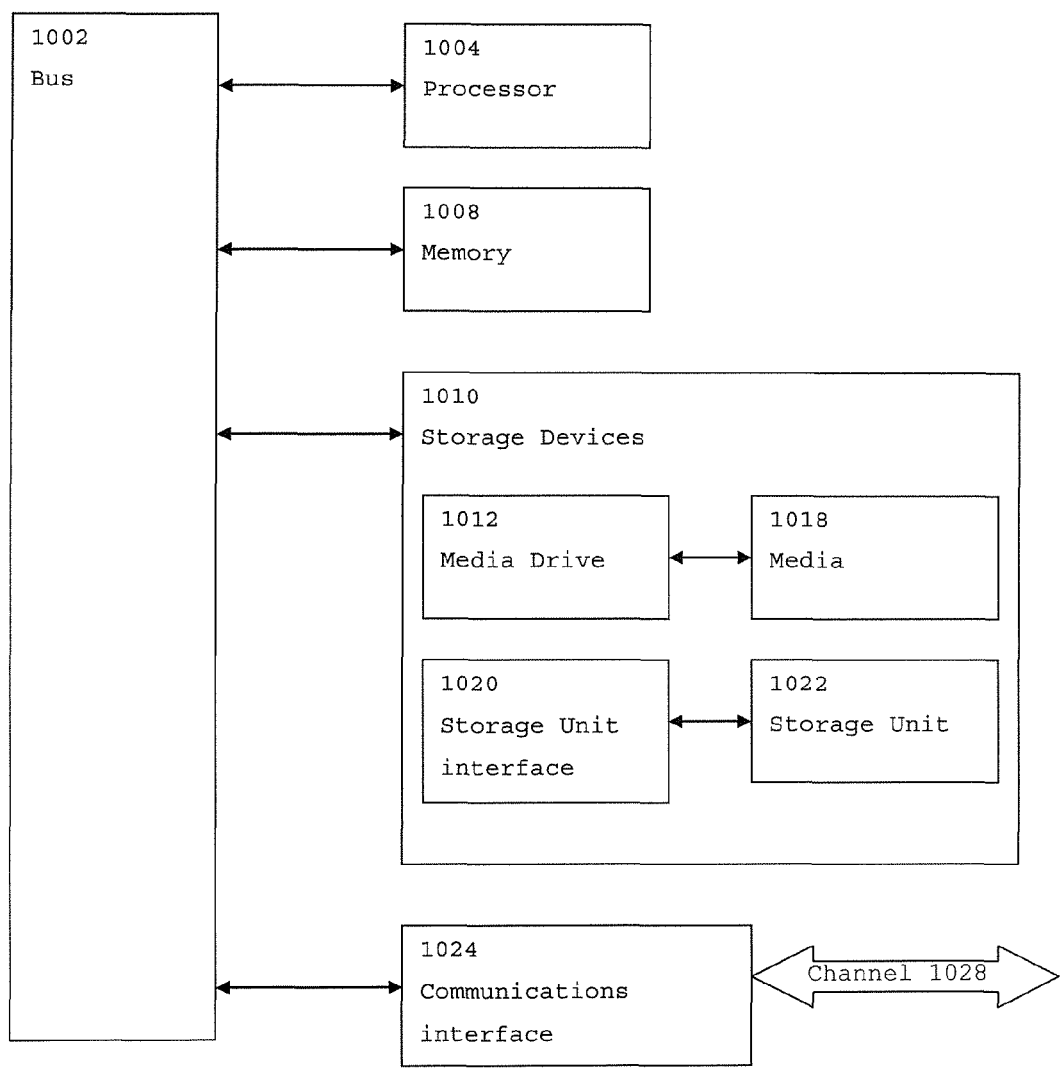
FIG. 10 is a schematic diagram, illustrating a typical signal processing system in the wireless communication network to implement processing functionality in embodiments of the invention.

FIGS. 9 and 10

FIG. 9 shows a method in accordance with an embodiment of the invention as a flowchart.

FIG. 10 shows a schematic diagram, illustrating a typical signal processing system in the wireless communication network to implement processing functionality in embodiments of the invention. The invention may in fact provide a tangible computer program product, having executable program code stored in it for programming signal processing logic to perform any of the methods of the invention. That tangible computer product may contain executable program code for implementing some of the functionality generally shown on FIG. 10.

FIG. 10 illustrates a typical computing system 1000 that may be employed to implement signal processing functionality in embodiments of the invention. Computing systems of this type may be used in access points and wireless communication units 450. Those skilled in the relevant art will also recognize how to implement the invention using other computer systems or architectures. Computing system 1000 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 1000 can include one or more processors, such as a processor 1004. Processor 1004 can be implemented using a general or special-purpose processing engine such as, for example, a microprocessor, microcontroller or other control module. In this example, processor 1004 is connected to a bus 1002 or other communications medium.

Computing system 1000 can also include a main memory 1008, such as random access memory (RAM) or other dynamic memory, for storing information and instructions to be executed by processor 1004. Main memory 1008 also may be used for storing temporary variables or other intermediate information during execution of instructions to be executed by processor 1004. Computing system 1000 may likewise include a read only memory (ROM) or other static storage device coupled to bus 1002 for storing static information and instructions for processor 1004.

The computing system 1000 may also include information storage system 1010, which may include, for example, a media drive 1012 and a removable storage interface 1020. The media drive 1012 may include a drive or other mechanism to support fixed or removable storage media, such as a hard disk drive, an optical disk drive, a compact disc (CD) or digital video drive (DVD) read or write drive (R or RW), or other removable or fixed media drive. Storage media 1018 may include, for example, a hard disk, optical disk, CD or DVD, or other fixed or removable medium that is read by and written to by media drive 1012. As these examples illustrate, the storage media 1018 may include a computer-readable storage medium having particular computer software or data stored therein.

In alternative embodiments, information storage system 1010 may include other similar components for allowing computer programs or other instructions or data to be loaded into computing system 1000. Such components may include, for example, a removable storage unit 1022 and an interface 1020, such as a program cartridge and cartridge interface, a removable memory (for example, a flash memory or other removable memory module) and memory slot, and other removable storage units 1022 and interfaces 1020 that allow software and data to be transferred from the removable storage unit 1018 to computing system 1000.

Computing system 1000 can also include a communications interface 1024. Communications interface 1024 can be used to allow software and data to be transferred between computing system 1000 and external devices. Examples of communications interface 1024 can include a modem, a network interface (such as an Ethernet or other MC card), a communications port (such as for example, a universal serial bus (USB) port), a PCMCIA slot and card, etc. Software and data transferred via communications interface 1024 are in the form of signals which can be electronic, electromagnetic, and optical or other signals capable of being received by communications interface 1024.

These signals are provided to communications interface 1024 via a channel 1028. This channel 1028 may carry signals and may be implemented using a wireless medium, wire or cable, fiber optics, or other communications medium. Some examples of a communication channel include a phone line, a cellular phone link, an RF link, a network interface, a local or wide area network, and other communications channels.

In this document, the terms 'computer program product' 'computer-readable medium' and the like may be used generally to refer to media such as, for example, memory 1008, storage device 1018, or storage unit 1022. These and other forms of computer-readable media may store one or more instructions for use by processor 1004, to cause the processor to perform specified operations. Such instructions, generally referred to as 'computer program code' (which may be grouped in the form of computer programs or other groupings), when executed, enable the computing system 1000 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 1000 using, for example, removable storage drive 1022, drive 1012 or communications interface 1024. The control module (in this example, software instructions or computer program code), when executed by the processor 1004, causes the processor 1004 to perform the functions of the invention as described herein.

Furthermore, the inventive concept can be applied to other signal processing circuits. It is further envisaged that, for example, a semiconductor manufacturer may employ the inventive concept in a design of a stand-alone device, such as a microcontroller, digital signal processor, or application-specific integrated circuit (ASIC) and/or any other sub-system element.

It will be appreciated that, for clarity purposes, the above description has described embodiments of the invention with reference to different functional units and processors. However, it will be apparent that any suitable distribution of functionality between different functional units or processors, for example with respect to the base stations, mobile communication units and other parts of the network, may be used without detracting from the invention. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors or configurable module components such as field programmable gate array (FPGA) devices.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Thus, an improved method and apparatus for determining the location of a femtocell has been described. The information on femto cell location may in turn subsequently be used to determine the geographical location of a wireless communication device.

A Method of Eliminating the Timing Offsets of Asynchronous Base Stations.

Equation [12] contained a term $dTm12$. This is a 'combined timing difference measurement'. The term $dTb12$ is equal to $(Tb1-Tb2)$.

WO2010/083943 provides one method of calculating the combined timing difference measurement. However, other methods can also be used. In WO '943, the approach taken can be summarised as follows:

Assume that a wireless communication unit is able to receive signals from a set of base stations $B1, B2, B3, \ldots Bi \ldots Bn$. Here 'i' is the ith base station, and n is the total number of base stations visible to that wireless communication unit. The variable 'n' can often be as large as 6, depending on the propagation environment. These signals may all be used to produce a measurement report for a single wireless communication unit.

The n base stations from which one wireless communication unit can receive signals at any one time are in fact only some of the base stations in the wireless communication network. We can call the total number of base stations in the network m. So the whole network comprises the following base stations:

$B1, B2, B3, \ldots Bi \ldots Bn \ldots Bm$.

In a typical large network, m might be 1000 base stations.

A wireless communication unit is able to receive signals for each of the pairs of base stations $Bi, Bj$ of the set $B1, B2, B3, \ldots Bi \ldots Bn$. Each pair of measurements by a wireless communication unit from a pair of base stations $Bi, Bj$ provides a value of timing difference $dTm$, which we can refer to as $dTm(i,j)$.

So for any pair of base stations Bi, Bj that are visible from a wireless communication unit, we can use an equation of the general form of equation [7] above:

$$dTm = Tm1 - Tm2 = dT\text{path} + dTb \qquad 5$$

When re-written for the pair of base stations Bi, Bj, equation [7] becomes:

$$Tm(i,j) = Tm(i) - Tm(j) = [T\text{path}(i) - T\text{path}(j)] + [Tb(i) - Tb(j)] \qquad 10$$

For the case of n=6, one wireless communication unit can therefore derive the following list of values of dTm(i,j):
dTm(1,2); dTm(1,3); dTm(1,4); dTm(1,5); dTm(1,6);
dTm(2,3); dTm(2,4); dTm(2,5); dTm(2,6);
dTm(3,4); dTm(3,5); dTm(3,6);
dTm(4,5); dTm(4,6);
dTm(5,6).

The above list may be derived each time that the wireless communication unit makes a measurement of the signals that it is able to receive. Typically, such a measurement occurs when the wireless communication unit is involved in a call. If one wireless communication unit makes several calls, then the resulting measurements will provide several lists of dTm measurements such as those shown above. The wireless communication unit may make the calls from a variety of locations, in which case dTpath will differ both for each measurement, and for each call.

For each list of dT(i,j) measurements, it is possible to construct a confidence measure. The confidence measure can, in turn, be used to weight the importance of each measurement. Starting from this list of dT(i,j) measurements, the confidence measures derivable from them allow the elimination of inaccurate estimates of each difference dT(I,j). The values that are not eliminated are therefore correct values for dT(i,j).

The starting point for the above method is an earlier set of measurements of signals from pairs of base stations Bi,Bj. The earlier set of measurements may, for example, have been obtained in a previous time window. That time window may be a fifteen minute window, during which wireless communication units in normal use obtain measurement of the timing of signals that they receive from base station. Thus the method of WO '943 provides an estimate of base station timing offsets that is constantly refined, and thus constantly up to date.

What is claimed is:

1. An asynchronous cellular wireless communication system (400) comprising:
   (i) a first macro cell (410A) and a second macro cell (420A);
   (ii) a femtocell (440A) associated with the first macro cell (410A);
   (iii) a mobile communication unit (450) operable to communicate with the femtocell (440A), the first macro cell (410A) and the second macro cell (420A), where the mobile communication unit is at a first distance (D1) from the first macro cell (410A) and at a second distance (D2) from the second macro cell (420A); and
   signal processing logic (412) performing the steps of:
      deriving a first timing difference measurement (dTm1) from a first set of communications (S1), the first set of communications comprising communications between:
         (i) the mobile communication unit (450) and the femtocell (440); and
         (ii) the mobile communication unit (450) and the first macro cell (410A);
      deriving a second timing difference measurement (dTm2), from a second set of communications (S2), the second set of communications comprising communications between:
         (i) the mobile communication unit (450) and the femtocell (440); and
         (ii) the mobile communication unit (450) and the second macro cell (420A);
      combining the first timing difference measurement (dTm1) and the second timing difference measurement (dTm2), to provide a combined timing difference measurement (dTm12);
      eliminating, from the combined timing difference measurement (dTm12), a value for a timing offset (dTb12) between the first macrocell (410A) and the second macrocell (420A), thereby providing a corrected timing difference measurement (dTm12c);
      deriving an estimate of a first difference (D12) between the first distance (D1) and the second distance (D2), as an estimate of the difference between the distances of the femtocell (440) from the first macrocell (410A) and the second macrocell (420A), using the corrected timing difference measurement (dTm12c); and
      combining the estimate of the first difference (D12) between the first distance (D1) and the second distance (D2) with at least a second distance estimate, thereby determining the geographical location of the femtocell (440).

2. An asynchronous cellular wireless communication system in accordance with claim 1, wherein the first set of communications (S1) comprises communications between:
   (i) at least two mobile communication units (450) and a HomeNodeB (440) of the femtocell (440A); and
   (ii) the at least two mobile communication units (450) and a base station (410) of the first macro cell (410A);
   the second set of communications (S2) comprises communications between:
   (i) the at least two mobile communication units (450) and the HomeNodeB (440) of the femtocell (440); and
   (ii) the at least two mobile communication units (450) and a base station (420) of the second macro cell (420A).

3. An asynchronous cellular wireless communication system in accordance with claim 1, wherein:
   the wireless communication unit (450) is at a third distance (D3) from a third macro cell (670A) of the cellular wireless communication system (600);
   the second distance estimate is an estimate of the difference (D13) between the first distance (D1) and the third distance (D3), the difference (D13) being used as an estimate of the difference between the distances of the femtocell (440A) from the first macrocell (410A) and the third macro cell (670A); and
   the signal processing logic (662) is adapted to provide the estimate of the difference (D13) between the first distance (D1) and the third distance (D3) by using the first timing difference measurement (dTm1), and a third timing difference measurement (dTm3) for communications between:
   (i) the mobile communication unit (650) and the femtocell (640); and
   (ii) the mobile communication unit (650) and the third macro cell (670A);
   whereby a value for a timing offset (dTb13) between the first macrocell (410A) and the third macro cell (670A) is eliminated.

4. An asynchronous cellular wireless communication system in accordance with claim 3, wherein:

the estimate of the difference (D12) between the first distance (D1) and the second distance (D2) comprises estimates derived from a first plurality of communications, and providing a first set of possible locations for the femtocell (640) that are located on a first hyperbola (660) comprising the steps of;

estimating of the difference (D13) between the first distance (D1) and the third distance (D3) comprises estimates derived from a second plurality of communications, and provides a second set of possible locations for the femtocell (640) that are located on a second hyperbola (680);

adapting the signal processing logic (662) to determine if the first and second hyperbolae (660, 680) intersect at only one point, and, if so, to select that point as the estimate of the location of the femtocell (640); and adapting the signal processing logic to determine if the first and second hyperbolae (660, 680) intersect at more than one point, and, if so, to use antenna orientation information and/or signal propagation delay information to select one of the two points as the most likely estimate of the location of the femtocell (640).

5. An asynchronous cellular wireless communication system in accordance with claim 1, wherein:

the signal processing logic (412, 612) is adapted to derive a difference between a first timing offset (Tb1) for signals transmitted by a first base station (410) of the first macro cell (410A), and a second timing offset (Tb2) for signals transmitted by a second base station (420) of the second macro cell (420A), and to use the difference as the timing offset (dTb12) between the first macrocell (410A) and the second macrocell (420A), where:

$dTb12 = Tb1 - Tb2.$

6. An asynchronous cellular wireless communication system in accordance with claim 5, wherein the first timing difference measurement (dTm1) and the second timing difference measurement (dTm2) are combined to provide the combined timing difference measurement (dTm12) as:

$dTm12 = (Tpath1 - Tpath2) + dTb12$ where Tpath1 is the time for signals to traverse distance D1, and Tpath2 is the time for signals to traverse distance D2.

7. A method of determining the geographical location of a femtocell (440A) of an asynchronous cellular wireless communication system (400), the cellular wireless communication system comprising a first macro cell (410A) and a second macro cell (420A), a femtocell (440A) associated with the first macro cell (410A), and a mobile communication unit (450) operable to communicate with the femtocell (440A), the first macro cell (410A) and the second macro cell (420A), wherein the mobile communication unit is at a first distance (D1) from the first macro cell (410A) and at a second distance (D2) from the second macro cell (420A);

the method comprising the steps of:
a) deriving a first timing difference measurement (dTm1) from a first set of communications (S1), the first set of communications comprising communications between:
(i) the mobile communication unit (450) and the femtocell (440A); and
(ii) the mobile communication unit (450) and the first macro cell (410A);

b) deriving a second timing difference measurement (dTm2), from a second set of communications (S2), the second set of communications comprising communications between:
(i) the mobile communication unit (450) and the femtocell (440); and
(ii) the mobile communication unit (450) and the second macro cell (420A);

c) combining the first timing difference measurement (dTm1) and the second timing difference measurement (dTm2), to provide a combined timing difference measurement (dTm12);

d) eliminating from the combined timing difference measurement (dTm12) a value for a timing offset (dTb12) between the first macrocell (410A) and the second macrocell (420A), to provide a corrected timing difference measurement (dTm12c);

e) deriving an estimate of a first difference (D12) between the first distance (D1) and the second distance (D2), as an estimate of the difference between the distances of the femtocell (440) from the first macrocell (410A) and the second macrocell (420A), using the corrected timing difference measurement (dTm12c); and f) combining the estimate of the first difference (D12) between the first distance (D1) and the second distance (D2) with at least a second distance estimate, thereby determining the geographical location of the femtocell (440).

8. The method of claim 7, wherein:

the mobile communication unit (650) is located at a third distance (D3) from a third macro cell (670A) of the cellular wireless communication system;

the second distance estimate is an estimate of the difference (D13) between the first distance (D1) and the third distance (D3); and the estimate of the difference (D13) between the first distance (D1) and the third distance (D3) is derived by applying steps a) to e) of claim 7, using the first timing difference measurement (dTm1) and a third timing difference measurement (dTm3), for communications between:
(i) the mobile communication unit (650) and the femtocell (640A); and
(ii) the mobile communication unit (650) and the third macro cell (670A);

and whereby a value for a timing offset (dTb13) between the first macrocell (410A) and the third macrocell (670A) is eliminated.

9. The method of claim 8, wherein:

the estimate of the difference (D12) between the first distance (D1) and the second distance (D2) comprises estimates derived from a plurality of communications, and provides a first set of possible locations for the femtocell that are located on a first hyperbola (660);

the estimate of the difference (D13) between the first distance (D1) and the third distance (D3) comprises estimates derived from a plurality of communications, and provides a second set of possible locations for the femtocell that are located on a second hyperbola (680);

if the first (660) and second (680) hyperbolae intersect at only one point, then that point is selected as the estimate of the location of the femtocell;

if the first (660) and second (680) hyperbolae intersect at two points, then antenna orientation information and/or signal propagation delay information is used to select one of the two points as the most likely estimate of the location of the femtocell.

10. The method of claim 7, wherein:
the mobile communication unit (850) is located at a third distance (D3) from a third macro cell (870A) of the cellular wireless communication system (800), and at a fourth distance (D4) from a fourth macro cell (890A) of the cellular wireless communication system;
the second distance estimate is an estimate of the difference (D34) between the third distance (D3) and the fourth distance (D4); and
the estimate of the difference (D34) between the third distance (D3) and the fourth distance (D4) is derived by applying steps a) to e) of claim 7, using a third timing difference measurement (dTm3) and a fourth timing difference measurement (dTm4);
wherein the third timing difference measurement (dTm3) is for communications between:
(i) the mobile communication unit (850) and the femtocell (840A); and
(ii) the mobile communication unit (850) and the third macro cell (870A);
and wherein the fourth timing difference measurement (dTm4) is for communications between:
(i) the mobile communication unit (850) and the femtocell (840A); and
(ii) the mobile communication unit (850) and the fourth macro cell (890A).

11. The method of claim 7, wherein:
the second distance estimate is derived from signal propagation delay information for communications between the mobile communication unit (450) and one of the first (410A) and second (420A) macro cells.

12. The method of claim 11, wherein:
the first estimate of the difference (D12) between the first distance (D1) and the second distance (D2) comprises estimates derived from a plurality of communications, and provides a first set of possible locations for the femtocell that are located on a first hyperbola (560);
the signal propagation delay information provides a set of possible locations for the femtocell (440A) that are located on a circle;
the point or points where the first hyperbola (560) and the circle intersect are selected as the estimate of the location of the femtocell (440A).

13. The method of claim 12, wherein combining the estimate of the difference (D12) between the first distance (D1) and the second distance (D2) with the second distance estimate further comprises:
using antenna orientation information for a sector antenna of a first base station (410) of the first macro cell (410A) or a sector antenna of a second base station (420) of the second macro cell (420A), to reduce multiple possible geographical locations of the femtocell (440A) down to an estimate of a single geographical location for the femtocell.

14. The method of claim 7, further comprising:
the mobile communication unit (450) providing a measurement report for communications occurring simultaneously between the mobile communication unit and each of the femtocell (440A), the first macro cell (410A) and the second macro cell (420A); and
deriving the first timing difference measurement (dTm1) and the second timing difference measurement (dTm2) from the measurement report.

15. The method of claim 7, wherein:
(i) the first timing difference measurement (dTm1) is a difference between a timing value (Tmf) for signals received by the mobile communication unit (450) from a HomeNodeB (440) of the femtocell (440A), and a first timing value (Tm1) for signals received by the mobile communication unit from a first base station (410) of the first macro cell (410A), where dTm1=Tmf−Tm1;
(ii) the second timing difference measurement (dTm2) is a difference between the timing value (Tmf) for signals received by the mobile communication unit (450) from a HomeNodeB (440) of the femtocell (440A), and a second timing value (Tm2) for signals received by the mobile communication unit from a second base station (420) of the second macro cell (420A), where $$dTm2=Tmf-Tm2;$$

(iii) the combined timing difference value (dTm12) is:

$$dTm12=dTm1-dTm2.$$

16. The method of claim 15, wherein:
the timing value (Tmf) for signals received by the mobile communication unit (450) from the HomeNodeB (440) of the femtocell (440A) is derived from a time stamp embedded in a signal received from the HomeNodeB (440) of the femtocell (440A), and a timing reference held by the mobile communication unit (450);
the first timing value (Tm1) is derived from a time stamp embedded in a signal received from the first base station (410) of the first macro cell (410A) and the timing reference held by the mobile communication unit (450); and
the second timing value (Tm2) is derived from a time stamp embedded in a signal received from the second base station (420) of the second macro cell (420A) and the timing reference held by the mobile communication unit (450).

17. The method of claim 7, wherein:
the value for the timing offset (dTb12) between the first macrocell (410A) and the second macrocell (420A) is a difference between a first timing offset (Tb1) for signals transmitted by a first base station (410) of the first macro cell (410A), and a second timing offset (Tb2) for signals transmitted by a second base station (420) of the second macro cell (420A), where $$dTb12=Tb1-Tb2.$$

18. The method of claim 17, wherein:
an estimate for the value for the timing offset (dTb12) is derived from data from a third set (S3) of mobile communications units, the mobile communications units of the third set (S3) receiving signals from the first base station (410) of the first macro cell the second base station (420) of the second macro cell;
and at least one mobile communication unit of the third set does not receive signals from the femtocell (440A).

19. The method of claim 17, wherein:
the value for the timing offset (dTb12) is a difference between the timing of 10 ms timing boundaries at the first base station (410) the second base station (420).

20. The method of claim 7, further comprising eliminating noise errors from the estimate of the difference (D12) between the first distance (D1) and the second distance (D2), using at least one of:
(i) antenna orientation information for a sector antenna of a first base station (410) of the first macro cell (410A);

(ii) antenna orientation information for a sector antenna of a second base station (420) of the second macro cell (420A); and
(ii) signal propagation delay information.

21. A method of determining the geographical location of a femtocell (640A) of an asynchronous cellular wireless communication system (600), comprising the steps of:
   obtaining first timing data from a first plurality of signals received by a first group of mobile communication units (450) from a femtocell (640A) and each of at least three macro cells (410A, 420A, 670A);
   obtaining second timing data from a second plurality of signals received by a second group of mobile communication units from the three macro cells (410A, 420A, 670A);
   from the second timing data, deriving:
      (i) an estimate of a first timing offset (dTb1,2) for a first pair (410A, 420A) of the macro cells; and
      (ii) an estimate of a second timing offset (dTb1,3) for a second pair (410A, 670A) of the macro cells;
   deriving a first estimate of the difference (D12) in path distance from each of the first pair (410A, 420A) of the macro cells to the femtocell (640A), using the first timing data and the estimate of the first timing offset (dTb1, 2);
   deriving a second estimate of the difference (D13) in path distance from each of the second pair (410A, 670A) of the macro cells to the femtocell (640A), using the first timing data and the estimate of the second timing offset (dTb1,3);
   combining the first (D12) and second (D13) estimates of the differences in path distance, to determining the geographical location of the femtocell.

22. A computer-readable storage device having executable program code stored therein for programming signal processing logic to perform a method of determining the geographical location of a femtocell (440A) of an asynchronous cellular wireless communication system (400), the cellular wireless communication system comprising a first macro cell (410A) and a second macro cell (420A), a femtocell (440A) associated with the first macro cell (410A), and a wireless communication unit (450) operable to communicate with the femtocell (440A), the first macro cell (410A) and the second macro cell (420A), wherein the wireless communication unit is at a first distance (D1) from the first macro cell (410A) and at a second distance (D2) from the second macro cell (420A); the method comprising the steps of:
   deriving a first timing difference measurement (dTm1) from a first set of communications (S1), the first set of communications comprising communications between:
      (i) the mobile communication unit (450) and the femtocell (440A); and
      (ii) the mobile communication unit (450) and the first macro cell (410A);
   deriving a second timing difference measurement (dTm2), from a second set of communications (S2), the second set of communications comprising communications between:
      (i) the mobile communication unit (450) and the femtocell (440); and
      (ii) the mobile communication unit (450) and the second macro cell (420A);
   combining the first timing difference measurement (dTm1) and the second timing difference measurement (dTm2), to provide a combined timing difference measurement (dTm12);
   eliminating from the combined timing difference measurement (dTm12) a value for a timing offset (dTb12) between the first macrocell (410A) and the second macrocell (420A), to provide a corrected timing difference measurement (dTm12c);
   deriving an estimate of a first difference (D12) between the first distance (D1) and the second distance (D2), as an estimate of the difference between the distances of the femtocell (440) from the first macrocell (410A) and the second macrocell (420A), using the corrected timing difference measurement (dTm12c); and
   combining the estimate of the first difference (D12) between the first distance (D1) and the second distance (D2) with at least a second distance estimate, thereby determining the geographical location of the femtocell (440).

23. A computer-readable storage device of claim 22, wherein the tangible computer program product comprises at least one of: a hard disk, a CD-ROM, an optical storage device, a magnetic storage device, a Read Only Memory (ROM), a Programmable Read Only Memory (PROM), an Erasable Programmable Read Only Memory (EPROM), an Electrically Erasable Programmable Read Only Memory (EEPROM), and a Flash memory.

* * * * *